No. 689,989. Patented Dec. 31, 1901.
M. R. PRUITTE.
LAWN MOWER.
(Application filed Oct. 17, 1899.)
(No Model.) 2 Sheets—Sheet 1.

WITNESSES
C. F. Patterson
M. A. Dodsworth

INVENTOR
Martin R. Pruitte
PER
G. W. Sues
ATTORNEY.

No. 689,989. Patented Dec. 31, 1901.
M. R. PRUITTE.
LAWN MOWER.
(Application filed Oct. 17, 1899.)
(No Model.) 2 Sheets—Sheet 2.
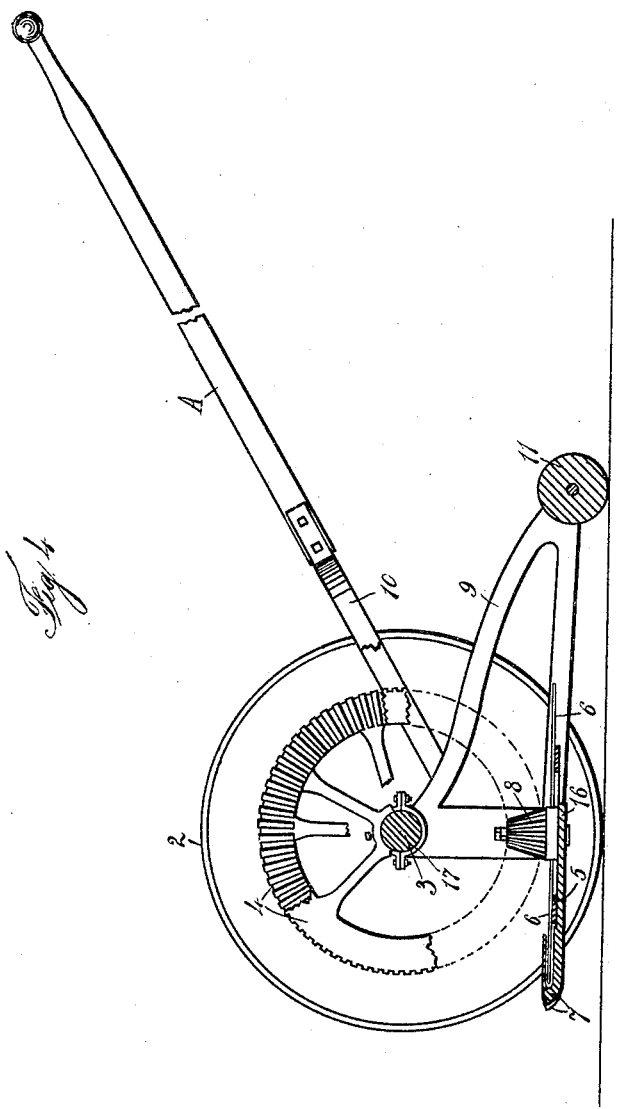
Witnesses:
C. F. Patterson
Ray J. Davenport
Inventor
Martin R. Pruitte
per Geo. W. Sues
Attorney.

UNITED STATES PATENT OFFICE.

MARTIN R. PRUITTE, OF OMAHA, NEBRASKA, ASSIGNOR OF ONE-HALF TO ALBERT W. KELPIN, OF OMAHA, NEBRASKA.

LAWN-MOWER.

SPECIFICATION forming part of Letters Patent No. 689,989, dated December 31, 1901.

Application filed October 17, 1899. Serial No. 733,868. (No model.)

*To all whom it may concern:*

Be it known that I, MARTIN R. PRUITTE, residing at Omaha, in the county of Douglas and State of Nebraska, have invented certain useful Improvements in Lawn-Mowers; and I do hereby declare that the following is a full, clear, and exact description of the invention, such as will enable others skilled in the art to which it appertains to make and use the same, reference being had to the accompanying drawings, which form a part of this specification.

This invention relates to an improvement in lawn-mowers.

The object of my invention is to provide a lawn-mower so arranged that either long or short grass may be easily cut, the aim of my invention further being to provide a lawn-mower which may be readily operated and be simple of construction.

Figure 1:
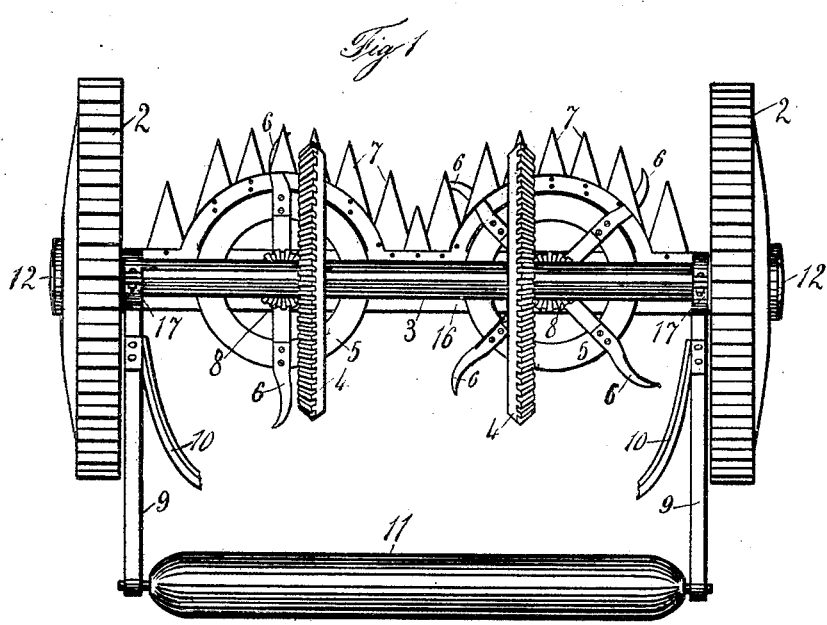
Figure 2:
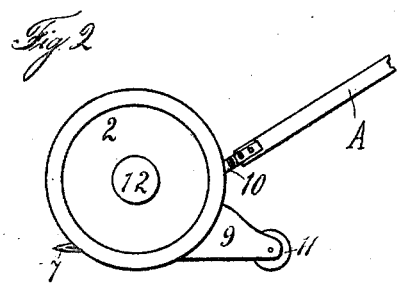
Figure 3:
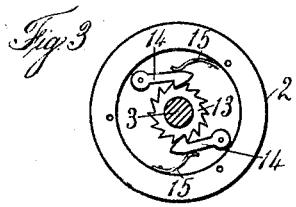

In the accompanying drawings I have shown in Figure 1 a top view of a lawn-mower embodying my invention with portions removed. Fig. 2 shows an end view thereof, while Fig. 3 shows an end detail disclosing the position of the shaft in conjunction with the pawls and ratchet used in conjunction therewith.

My invention embodies, essentially, a shaft 3, which at each end is supported by means of a wheel 2, secured to the shaft by any suitable means. Working within these wheels 2 are the pawls 14 14 and the springs 15 15, while secured to the shaft 3 is a ratchet 13, engaged by said pawls 14 14. This is a structure common in lawn-mowers, for the reason that the blades are not actuated when the lawn-mower is being carried backward. Extending from this shaft 3 is a suitable boxing 17 17, from which extend the arms 9 9, supporting the drag-reel 11, and to these bars 9 are also secured the brackets 10, holding the handle A. Depending from the boxings 17 are suitable bars which below hold the rod 16, provided with the projecting double knives 7 7, and between which knives revolve and pass the cutters 6, as is shown. These knives 7 are positioned in the shape of semicircles and comprise an upper and lower shell united at a point so that the cutter 6 may pass between these double knives.

Mounted upon the shaft 3 are two bevel-gears 4, while projecting from the bar 16 are two stub-shafts, each provided with a pinion 8, each pinion meshing with one bevel-gear 4, as is shown. These pinions 8 8 revolve toward one another, so that the cutters 6 also are thrown toward one another, and they are so positioned that the cutters upon one side will not collide with the cutters upon the other, the cutters being positioned at an angle of forty-five degrees, so that their ends do not interfere.

In operating my lawn-mower it is simply necessary to push the same through the grass, when the cutters, revolving between the double blades, work toward one another and force the grass against the cutter-knives 7. Any suitable speed may of course be imparted to these cutters. So, also, if desired, could more than two sets of revolving cutters be used, as these cutters are secured to reels which revolve with the pinions 8.

Having thus described my said invention, what I claim as new, and desire to secure by United States Letters Patent, is—

In a lawn-mower of the character described, the combination with a wheel-supported shaft, of ratchet-wheels upon the ends of said shaft, pawls secured to said supporting-wheels adapted to engage said ratchet-wheels, boxings secured to said shaft, arms extending from said boxings, a drag-reel supported by said arms, bars depending from said boxings, a rod held by said bars, projecting knives positioned in two semicircles secured to said rod, two bevel-gears secured to said shaft, two stub-shafts projecting upward from said bar, a pinion secured to each of said stub-shafts, said pinions meshing with said gears, cutters secured to said stub-shafts arranged to revolve toward one another, and an operating-handle secured to said arms, as and for the purpose set forth.

Signed in the presence of two witnesses.

MARTIN R. PRUITTE.

Witnesses:
MABEL A. DODSWORTH,
CLEMENT F. PATTERSON.